United States Patent [19]

Toy

[11] 4,434,995
[45] Mar. 6, 1984

[54] RETRIEVABLE BOAT TRAILER

[76] Inventor: Stanley A. Toy, 49 Cypress Dr., Palm Harbor, Fla. 33563

[21] Appl. No.: 400,897

[22] Filed: Jul. 22, 1982

[51] Int. Cl.$^3$ .............................................. B60P 3/10
[52] U.S. Cl. .................................. 280/414.1; 114/344; 280/8
[58] Field of Search ..................... 280/414, 511, 414.1, 280/414.2, 30, 32, 401, 24, 8, 9; 114/344

[56] References Cited

U.S. PATENT DOCUMENTS 2,219,401  10/1940  Sampsell ..................... 114/344 X
2,748,962   6/1956  Murray ...................... 280/414.1 X
3,104,115   9/1963  Moore ............................ 280/8

FOREIGN PATENT DOCUMENTS 1003877  1/1977  Canada ........................... 280/9

*Primary Examiner*—Joseph F. Peters, Jr.
*Assistant Examiner*—Mitchell J. Hill
*Attorney, Agent, or Firm*—Ronald E. Smith

[57] ABSTRACT

A boat trailer specifically designed to permit retrieval thereof when the wheels rotatably mounted thereon have fallen off an underwater precipice of the type often encountered when launching a boat at a boat ramp. A pair of wedge or ramp shaped members are integrally formed with or fixedly secured to the underside of a conventional boat trailer frame, just forwardly of the trailer wheels. The respective base portions of the ramp members abut the underside of the side rails of such trailer frame, and the respective trailing edges of the ramp members depend to such base portions, just forwardly of the respective wheel members, extending to a point just below the axis of rotation of such wheel members. The respective operative surfaces of the ramp members correspond to the hypotenuse of a triangle and slidingly engage the transverse edge of the precipice when the trailer is retrieved from the water.

6 Claims, 4 Drawing Figures

U.S. Patent  Mar. 6, 1984  4,434,995
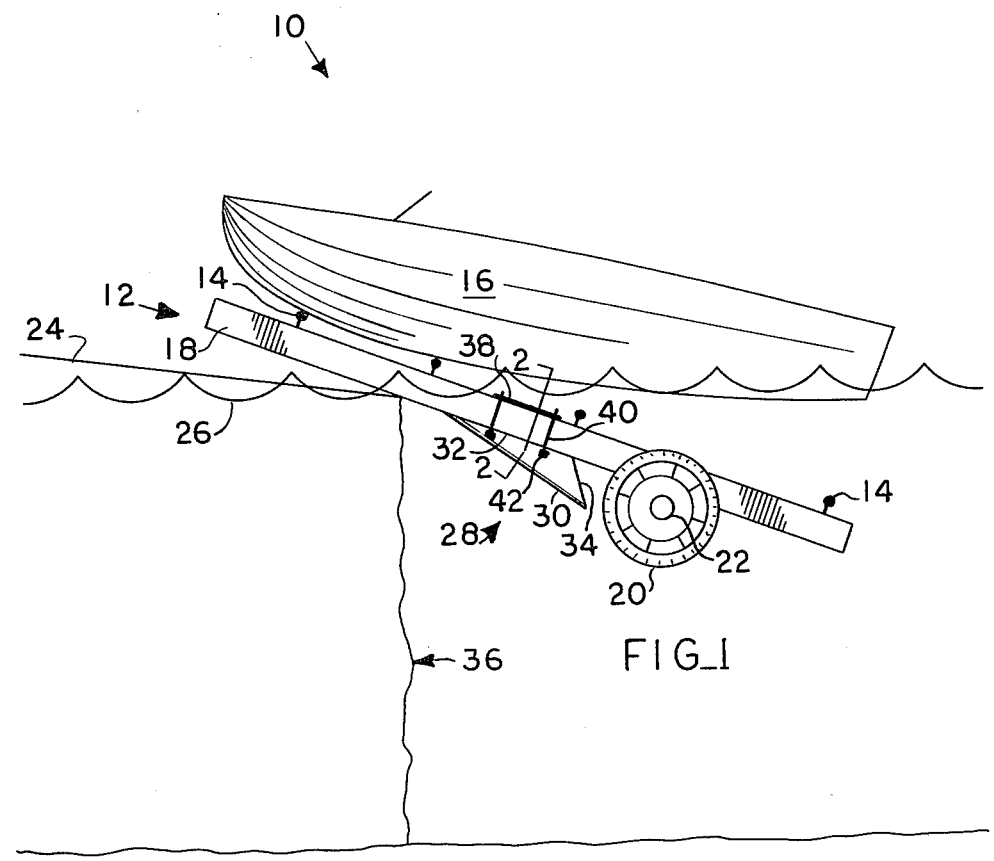
FIG_1
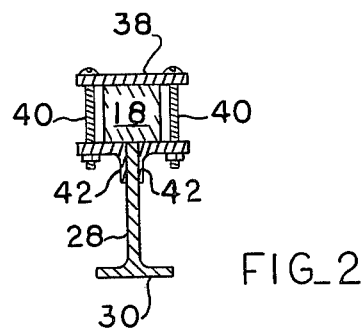
FIG_2
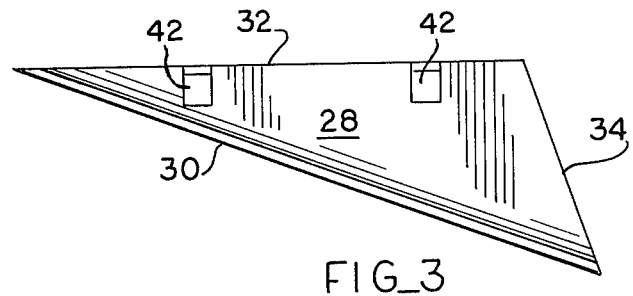
FIG_3
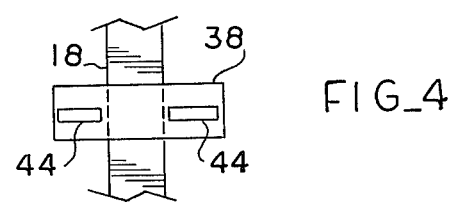
FIG_4

RETRIEVABLE BOAT TRAILER

BACKGROUND OF THE INVENTION

1. Field of the Invention

This invention relates generally to improvements in boat trailer construction, and more specifically relates to a boat trailer having ramp-like means provided on the underside thereof to permit sliding retrieval of a trailer the wheels of which have fallen off the end of a permanent boat launching ramp.

2. Description of the Prior Art

A search of United States patents that was conducted prior to the filing of this disclosure located the following patents in the general field of this invention:

| Patentee | U.S. Pat. No. | Date of Issue |
| --- | --- | --- |
| O'Connor et. al. | 2,982,561 | 05-02-61 |
| Martin | 3,164,965 | 01-12-65 |
| Carter | 3,190,674 | 06-22-65 |
| Whitley, Jr. | 3,883,159 | 05-13-75 |
| Lovendahl | 3,989,264 | 11-02-76 |

The field of search covered Class/subclass 280/414.1, 414.2, 511.

The earlier devices solve problems of the type encountered in launching or loading a boat from or onto, respectively, an immersible boat trailer, or provide spare tire means for such trailers, but do not show or suggest a solution of the type disclosed hereinafter to the problem of retrieving a boat trailer the wheels of which have gone over a ledge at the end of an underwater boat ramp.

SUMMARY OF THE INVENTION

The longstanding but heretofore unfulfilled need for a boat trailer that overcomes the limitations of earlier trailers is now fulfilled in the form of a trailer provided with ramp like members that are disposed just forwardly of the wheels of the trailer. If such wheels fall off the end of a boat ramp, the trailer is nevertheless retrievable in the conventional manner, because the leading edge of the novel ramp members will slidingly engage the ledge-defining edge of the boat ramp, thereby lifting the trailer wheels over such ledge attendant towing retrieval of such trailer. Such leading edge, or operative surface, of the novel ramp members, necessarily extends to a point downwardly of the axis of rotation of the trailer's wheel members.

It is therefore understood that the primary object of this invention is to provide a boat trailer that can be easily retrieved even when its wheels have fallen off the end of a conventional boat ramp.

Another object is to provide a structure, which accomplishes the foregoing object, that may be provided integrally formed with a boat trailer as original equipment, or which can be retrofit to conventionally manufactured trailers.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a side elevational view of a boat trailer fitted with the novel ramp means, showing the trailer with its bogie wheels having fallen off the edge of a conventional boat ramp.

FIG. 2 is a vertical sectional view taken along line 2—2 of FIG. 1.

FIG. 3 is a side elevational view of the novel ramp means.

FIG. 4 is a top plan view of the top plate which mounts the novel ramp means in retrofit applications.

DETAILED DESCRIPTION OF THE PREFERRED EMBODIMENT

Referring now to FIG. 1, there it will be seen that an embodiment of the invention illustrative of the concept thereof is indicated 10 as a whole. A boat trailer, generally indicated 12, has a plurality of support members, collectively designated 14, that releasably support a boat 16. The support members 14 are in turn secured to the frame 18 of the boat trailer. The frame 18 is generally rectangular in configuration, and has a pair of parallel, longitudinally aligned, transversely spaced side rail members, only one of which is shown, indicated also by the reference numeral 18, that are interconnected at longitudinally spaced intervals by transversely aligned interconnecting struts, not shown. Such frame construction is conventional.

The frame 18 is supported by bogie wheel members 20, only one of which is shown, which are conventionally interconnected and mounted for rotation by an axle means. The end of the axle means and the axis of rotation of such axle means is designated 22 in the drawings. As shown in FIG. 1, the bogie wheels 20 have fallen off a ledge defined by a conventional boat ramp 24. The water 26 is often too deep to permit the boat owners to stand in the water and lift the trailer back onto the ramp 24. In the absence of the inventive means to be more fully disclosed hereinafter, any attempt to retrieve the trailer in such condition by pulling it out of the water with a motor driven vehicle will result in a bent frame, a bent axle, separated bogie wheels, or damage to the towing vehicle.

The means which permits easy retrieval of the trailer comprises a three-sided, wedge-like, triangular in configuration ramp means, designated 28, only one of which is shown. As best shown in FIG. 2, the ramp means 28 is a web-like structure, having a flanged bottom edge 30 and an unflanged upper edge 32. The upper edge 32, as shown in FIG. 1, abuts the underside of the side rail 18 and is either fixedly secured thereto by means to be described hereinafter, or may be welded thereto at the time the trailer is manufactured. Each ramp means 28 includes a trailing edge 34 that descends as shown in FIG. 1 so that the lowermost point of the ramp means 28 is downwardly of the axis of rotation 22 of the wheels. The leading edge 30 of the ramp means 28 will clearly slidingly engage the edge 36 of the boat ramp 24 when the trailer 12 is pulled from the water by a vehicle, not shown, thereby lifting the wheels 20 up and over such ledge 36.

As best shown in FIG. 2, the novel ramp means 28 can be installed on a conventional trailer 12 quickly and easily. A flat top plate 38 is disposed atop the respective side rails 18, 18, and elongate bolt members 40, 40 interconnect the top plates 38 and cooperatively positioned angle members 42, 42 that are welded or otherwise secured to the novel ramp means 28 adjacent the top edge 32 thereof. As shown in FIG. 4, the top plates 38 have elongate transverse apertures 44 to accommodate side rails of differing widths. The angle members 42 are provided with cooperatively positioned elongate apertures as well. Thus, the novel ramp means 28, 28 are secured to the side rails 18, 18 by tightening said bolts 40. Clearly, the attachment means just described is suitable where the side rails 18 are of square cross section, as depicted in FIG. 3, or where such side rails are of I beam or other configuration.

It is important to note that the leading edge 30 of the inventive ramp means 28 and the bottom of the side rails 18 form a feather edge when they merge, as shown in FIG. 1. Such feather edge allows the sliding engagement of leading edge 30 and the boat ramp ledge 36 to begin effortlessly. A synergistic effect of the novel ramp means 28 is noticed when a boat trailer equipped therewith is being backed down a ramp 24 into the water. If the bogie wheels 20 do fall off ledge 36, the leading edge 30 of the ramp means 28 will act as a brake, thereby allowing the driver of the backing vehicle to reverse the direction of travel of the trailer. The novel ramp means will last the life of the trailer, never needs adjustment, has no moving parts and is thus maintenance free, and fills a need of the boat owning public.

It will thus be seen that the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
That which is claimed is:

1. A boat trailer, comprising,
   a frame portion of generally rectangular configuration,
   said frame portion having wheel members rotatably mounted thereto for transporting said frame portion,
   said frame portion having a hitch means provided as a part thereof so that said frame portion can be towed by a motor driven vehicle,
   a ramp means secured to said frame portion just forwardly of said wheel members,
   said ramp means having a leading edge,
   said leading edge forming a feather edge with said frame portion so that an obstacle will slide from said frame portion onto said ramp means unobstructed by said feather edge when said boat trailer is retrieved from a position where its wheel members have fallen from a precipice,
   said frame portion further comprising a pair of longitudinally aligned, transversely interconnected side rail members disposed in parallellism with one another,
   and wherein said ramp means are mounted in depending relation to said side rail members, in transverse alignment to one another.

2. The boat trailer of claim 1, wherein said ramp means comprises a pair of identically formed, generally wedge-shaped, planar in configuration, rigid ramp members.

3. The boat trailer of claim 2, wherein both of said ramp members have a first flat edge adapted for mounting against the underside of said side rails, said first edge corresponding in position to the base of a triangle,
   a second flat edge extending downwardly, from the rearmost end of said first edge, just forwardly of said wheel members, to a point downwardly of the axis of rotation of said wheel members, said second edge corresponding in position to the opposite side of a triangle,
   and a third flat edge extending from the forward most end of said first edge to the lower most end of said second edge, said third edge corresponding in position to the hypoteneuse of a triangle.

4. The boat trailer of claim 3, wherein said ramp members are integrally formed with said side rails of the frame portion of said boat trailer.

5. The boat trailer of claim 4, wherein said ramp members are separately formed relative to the frame portion of said boat trailer, and wherein attachment means are provided to releasably secure said ramp members to said frame portion so that said ramp members can be retrofit to conventionally manufactured boat trailers.

6. The boat trailer of claim 5, wherein said attachment means comprises, in combination,
   a first flange means integrally formed with said first flat edge,
   said first flange means disposed in orthogonal relation to said first edge and said first flange means disposed relative to said first edge so that said first edge longitudinally divides said first flange means,
   said first flange means having a pair of elongate, transversely aligned perforations formed therein on opposite sides of said first edge in equidistantly spaced relation thereto,
   a second perforated flange means adapted to be supported atop the upper surface of said side rails so that said first and second flange means are disposed in sandwiching relation to said side rails,
   and elongate bolt means for interconnecting said first and second flange means, said bolt means extending through the respective aligned perforations formed in said first and second flange means, said elongate perforations allowing transverse adjustment of said bolt means depending on the transverse dimensions of the side rails of said frame portion.

* * * * *